United States Patent
Xu et al.

(10) Patent No.: US 12,063,264 B2
(45) Date of Patent: Aug. 13, 2024

(54) INFORMATION INDICATING METHOD AND APPARATUS, ELECTRONIC DEVICE AND STORAGE MEDIUM

(71) Applicant: BEIJING BYTEDANCE NETWORK TECHNOLOGY CO., LTD., Beijing (CN)

(72) Inventors: Qianyi Xu, Beijing (CN); Shuhan Lu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/725,896

(22) Filed: Apr. 21, 2022

(65) Prior Publication Data
US 2022/0247809 A1 Aug. 4, 2022

Related U.S. Application Data

(63) Continuation of application No. PCT/CN2021/100267, filed on Jun. 16, 2021.

(30) Foreign Application Priority Data

Jul. 9, 2020 (CN) .......................... 202010657852.3

(51) Int. Cl.
G06F 17/00 (2019.01)
G06F 16/16 (2019.01)
(Continued)

(52) U.S. Cl.
CPC ............ H04L 67/06 (2013.01); G06F 16/168 (2019.01); G06F 16/176 (2019.01); G06F 40/18 (2020.01); H04L 65/4015 (2013.01)

(58) Field of Classification Search
CPC ...... G06F 16/168; G06F 16/176; G06F 40/18; G06F 16/16; H04L 67/06
(Continued)

(56) References Cited

U.S. PATENT DOCUMENTS 8,144,184 B2 * 3/2012 Carter ................ G07C 9/00309
348/14.06
10,893,081 B2 * 1/2021 Lo .......................... H04L 67/131
(Continued)

FOREIGN PATENT DOCUMENTS

CN 2000092217 A 3/2000
CN 20007004611 A 1/2007
(Continued)

OTHER PUBLICATIONS

Sun, Transparent Adaptation of Single-User Applications for Multi-User Real-Time Collaboration, ACM Transactions on Computer-Human Interaction, vol. 13, No. 4, Dec. 2006, pp. 531-582 (Year: 2006).*

(Continued)

*Primary Examiner* — Stephen S Hong
*Assistant Examiner* — Matthew J Ludwig
(74) *Attorney, Agent, or Firm* — Faegre Drinker Biddle & Reath LLP

(57) ABSTRACT

The embodiments of the disclosure disclose an information indicating method and apparatus, an electronic device and a storage medium, where the method includes: acquiring a first position parameter of first target information in a current page, where the current page is a page in a shared file shared by a sharer client; acquiring a second position parameter of second target information in a display page of the sharer client; and determining an indication identifier according to
(Continued)

the first position parameter and the second position parameter, and indicating the second target information according to the indication identifier.

28 Claims, 3 Drawing Sheets

(51) Int. Cl.
*G06F 16/176* (2019.01)
*G06F 40/18* (2020.01)
*H04L 65/401* (2022.01)
*H04L 67/06* (2022.01)

(58) Field of Classification Search
USPC .......................................................... 715/700
See application file for complete search history.

(56) References Cited

U.S. PATENT DOCUMENTS

| | | | |
|---|---|---|---|
| 11,226,983 B2* | 1/2022 | Kao | H04L 63/08 |
| 2006/0184872 A1 | 8/2006 | Dontcheva et al. | |
| 2007/0078872 A1* | 4/2007 | Cohen | G06F 40/18 |
| 2013/0061273 A1 | 3/2013 | Reisman | |
| 2014/0123002 A1* | 5/2014 | Wessling | G06F 40/169 |
| | | | 715/273 |
| 2015/0067589 A1* | 3/2015 | Xiao | G06F 3/04883 |
| | | | 715/788 |
| 2017/0235848 A1* | 8/2017 | Van Dusen | G06N 5/02 |
| | | | 705/12 |
| 2017/0285895 A1* | 10/2017 | Nathwani | G06F 40/166 |
| 2018/0032243 A1* | 2/2018 | Lu | G06F 3/04845 |
| 2019/0095403 A1 | 3/2019 | Parhar et al. | |
| 2019/0121840 A1* | 4/2019 | Abbott | G06F 40/106 |
| 2019/0312917 A1 | 10/2019 | Choi et al. | |
| 2019/0320039 A1* | 10/2019 | Kamal | H04L 63/0861 |
| 2020/0110792 A1* | 4/2020 | Tsabba | G06F 3/167 |
| 2021/0097135 A1* | 4/2021 | Tian | G06F 40/169 |
| 2021/0326522 A1* | 10/2021 | Sahgal | H04L 67/53 |

FOREIGN PATENT DOCUMENTS

| | | |
|---|---|---|
| CN | 2010033229 A | 2/2010 |
| CN | 101820430 A | 9/2010 |
| CN | 102572091 A | 7/2012 |
| CN | 103973771 A | 8/2014 |
| CN | 104753974 A | 7/2015 |
| CN | 2016177614 A | 10/2016 |
| CN | 106534268 A | 3/2017 |
| CN | 106657255 A | 5/2017 |
| CN | 107040457 A | 8/2017 |
| CN | 109416704 A | 3/2019 |
| CN | 109669924 A | 4/2019 |
| CN | 110019058 A | 7/2019 |
| CN | 110417877 A | 11/2019 |
| CN | 110737415 A | 1/2020 |
| CN | 110750197 A | 2/2020 |
| CN | 111008085 A | 4/2020 |
| CN | 111078655 A | 4/2020 |
| CN | 111107116 A | 5/2020 |
| CN | 113535662 A | 10/2021 |
| KR | 10-2014-0099606 A | 8/2014 |
| KR | 10-2015-0054246 A | 5/2015 |
| KR | 10-2015-0081766 A | 7/2015 |
| KR | 10-2019-0011422 A | 2/2019 |
| WO | 2019061360 A1 | 4/2019 |

OTHER PUBLICATIONS

International Search Report issued Sep. 27, 2022 in International Patent Application No. PCT/CN2021/100267, with English translation.
Notice of handling the registration formalities issued Jan. 20, 2023 in Chinese Patent Application No. 202010657852.3, with English translation (15 pages).
Chen, Y., "Design and implementation of video analytics system based on edge computing," 2018 International Conference on Cyber-Enabled Distributed Computing and Knowledge Discovery (8 Pages).
Jian-gan Xu, Design and implementation of mobile device oriented meeting support system, A thesis Submitted to Southeast University for the Academic Degree of Master Engineering, Oct. 2015 (85 pages).
First Office Action issued Oct. 9, 2022 in Chinese Patent Application No. 202010657852.3, with English translation (22 pages).
Examination report issued Jul. 5, 2023 in IN Patent Application No. 202327001311, with English translation (6 pages).
Notice of Reasons for Refusal issued May 16, 2023 in JP Patent Application No. 2023-500031, with English translation (6 pages).
Office Action issued Oct. 19, 2023 in Korean Application No. 10-2023-7000841, with English translation (11 pages).
Extended European Search Report and Opinion issued Sep. 8, 2023 in European Application No. 21838909.6 (9 pages).
Office action received from Korean patent application No. 10-2023-7000841 mailed on Feb. 20, 2024, 6 pages (3 pages English Translation and 3 pages Original Copy).

* cited by examiner

INFORMATION INDICATING METHOD AND APPARATUS, ELECTRONIC DEVICE AND STORAGE MEDIUM

CROSS-REFERENCE TO RELATED APPLICATIONS

This application is a continuation of International Application No. PCT/CN2021/100267, filed on Jun. 16, 2021, which claims the priority of a Chinese patent application No. 202010657852.3, filed with the China National Intellectual Property Administration on Jul. 9, 2020 and entitled "INFORMATION POSITION INDICATION METHOD AND APPARATUS, ELECTRONIC DEVICE AND STORAGE MEDIUM". Both of the aforementioned applications are hereby incorporated by reference in their entireties.

TECHNICAL FIELD

Embodiments of the present disclosure relate to the field of computer technology, in particular to an information indicating method and apparatus, an electronic device and a storage medium.

BACKGROUND

With continuous development of Internet and communication technology, information communication through communication applications has become one of important ways for users to exchange information. At present, when sharing information based on communication applications, when a shared client freely browses information shared by a sharer client, a current information position of the sharer client cannot be indicated, resulting in that a user of the shared client cannot perceive the current information position of the sharer client and cannot learn a sharing process, and even cannot perceive whether the shared client is in a free browsing mode, thus leading to lower user sharing experience.

SUMMARY

The embodiments of the disclosure provide an information indicating method and apparatus, an electronic device and a storage medium, which can indicate a current information position of a sharer client, thereby improving user sharing experience.

In a first aspect, an embodiment of the present disclosure provides an information indicating method, including:
  acquiring a first position parameter of first target information in a current page, where the current page is a page in a shared file shared by a sharer client;
  acquiring a second position parameter of second target information in a display page of the sharer client; and
  determining an indication identifier according to the first position parameter and the second position parameter, and indicating the second target information according to the indication identifier.

In a second aspect, an embodiment of the present disclosure further provides an information indicating apparatus, including:
  a first position parameter acquiring module, configured to acquire a first position parameter of first target information in a current page, where the current page is a page in a shared file shared by the sharer client;
  a second position parameter acquiring module, configured to acquire a second position parameter of second target information in a display page of the sharer client; and
  an indication identifier determining module, configured to determine an indication identifier according to the first position parameter and the second position parameter, and indicate the second target information according to the indication identifier.

In a third aspect, an embodiment of the present disclosure further provides an electronic device, including:
  one or more processors;
  a storage apparatus, configured to store one or more programs,
  when the one or more programs are executed by the one or more processors, the one or more processors implement the information indicating method according to any one of the embodiments of the present disclosure.

In a fourth aspect, an embodiment of the present disclosure further provides a storage medium including computer executable instructions, where when the computer executable instructions are executed by a computer processor, the information indicating method according to any one of the embodiments of the present disclosure is executed.

In a fifth aspect, an embodiment of the present disclosure further provides a computer program product, where the computer program product includes a computer program stored in a readable storage medium, one or more processors of an electronic device can read the computer program from the readable storage medium, and the one or more processors execute the computer program to cause the electronic device to execute the information indicating method according to any one of the embodiments of the present disclosure.

In a sixth aspect, an embodiment of the present disclosure further provides a computer program stored in a readable storage medium, one or more processors of an electronic device can read the computer program from the readable storage medium, and the one or more processors execute the computer program to cause the electronic device to execute the information indicating method according to any one of the embodiments of the present disclosure.

According to technical solutions of the embodiments of the present disclosure, after acquiring a shared file shared by a sharer client, a shared client can displayed the shared file simultaneously with the sharer client. In addition, in a process of browsing the shared file, the shared client can acquire a first position parameter of first target information in a current page, and can also acquire a second position parameter of second target information in a display page of the shared client. Further, the shared client can determine an indication identifier according to the first position parameter and the second position parameter, and indicate the second target information according to the indication identifier. By indicating the second target information of the sharer client on the shared client, a current information position of the sharer client can be provided to a user of the shared client, which is beneficial for learning a sharing process and prompts the user of the current free browsing mode, thereby improving user sharing experience.

In addition, the commonly used information sharing technology is the screen sharing technology, that is, capturing a video stream of a screen interface of the sharer client and transmitting the video stream to the shared client through a network bandwidth. Due to high requirements of traditional technologies for network and video compression, various problems such as network delay and decompression distortion are prone to occur in an image transmission process, resulting in that a shared picture is not smooth and clear, which seriously affects an information sharing effect and user experience. The information sharing technology involved in the information indicating method disclosed in the embodiments of the present disclosure is a technology of sharing page content of a shared file to the shared client so that the shared client can display the shared file, thereby realizing high fidelity and smooth information sharing and improving user sharing experience.

BRIEF DESCRIPTION OF DRAWINGS

The above and other features, advantages and aspects of the embodiments of the present disclosure will become more apparent in combination with accompanying drawings and with reference to following specific embodiments. Throughout the drawings, same or similar reference numbers represent same or similar elements. It should be understood that the drawings are schematic and that originals and elements are not necessarily drawn to scale.

DESCRIPTION OF EMBODIMENTS

Embodiments of the present disclosure will be described in more detail below with reference to the accompanying drawings. Although some embodiments of the present disclosure are shown in the accompanying drawings, it should be understood that the present disclosure may be implemented in various forms and should not be construed as limited to the embodiments set forth herein, on the contrary, these embodiments are provided for a more thorough and complete understanding of the present disclosure. It should be understood that the drawings and embodiments of the present disclosure are only for exemplary purposes and are not intended to limit the protection scope of the present disclosure.

It should be understood that steps described in the method implementation of the present disclosure may be performed in different orders and/or in parallel. Further, the method implementation may include additional steps and/or omit performing illustrated steps. The scope of the present disclosure is not limited in this regard.

As used herein, the term "including" and its deformation are open-ended, that is, "including but not limited to". The term "based on" is "based at least in part on". The term "one embodiment" means "at least one embodiment"; the term "another embodiment" means "at least one other embodiment"; the term "some embodiments" means "at least some embodiments". Relevant definitions of other terms will be given in the following description.

It should be noted that concepts such as "first" and "second" mentioned in the present disclosure are only used to distinguish different apparatuses, modules or units, and are not used to limit an order or interdependence of functions performed by these apparatuses, modules or units.

It should be noted that modifications of "one" and "multiple" mentioned in the present disclosure are schematic rather than restrictive, and those skilled in the art should understand that they should be understood as "one or multiple" unless otherwise clearly indicated in the context.

Embodiment 1

Figure 1:
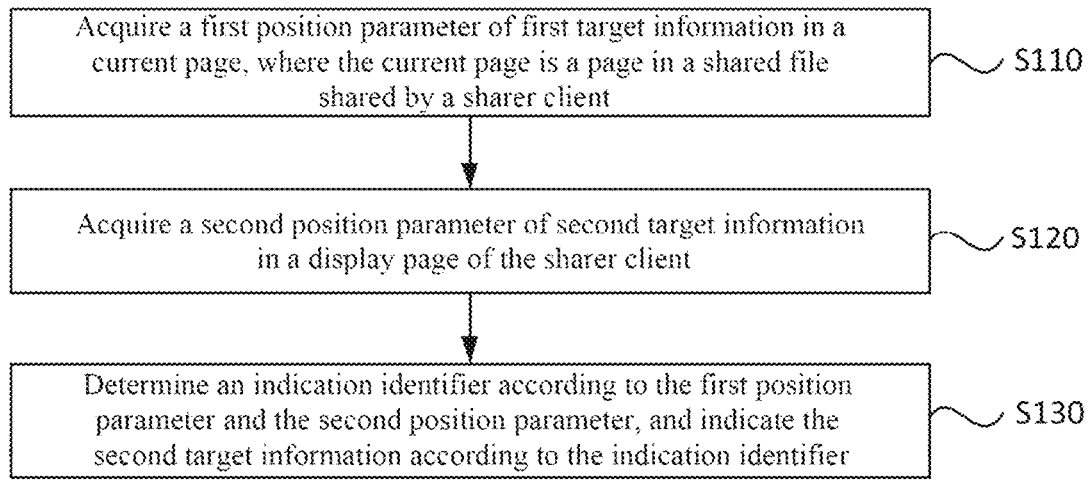
FIG. 1 is a schematic flowchart of an information indicating method provided by Embodiment 1 of the present disclosure.

FIG. 1 is a schematic flowchart of an information indicating method provided by Embodiment 1 of the present disclosure. The embodiment of the present disclosure is particularly suitable to a situation where a position of information currently explained by a sharer client is indicated on an interface of a shared client when the shared client freely browses a shared file shared by the sharer client. The method may be executed by an information indicating apparatus, and the apparatus may be implemented in a form of software and/or hardware. The apparatus may be configured in an electronic device, such as a smart phone, a tablet computer, a laptop or a desktop computer.

As shown in FIG. 1, an information indicating method provided by the present embodiment includes the following steps.

S110: acquire a first position parameter of first target information in a current page, where the current page is a page in a shared file shared by a sharer client.

In an information sharing method involved in the information indicating method disclosed in the embodiment of the present disclosure, the shared file may be shared in the following manner: first, an information sharing server (for example, a DOCS server) may receive a sharing instruction triggered by any client within a communication range (for example, within a communication range and participating in a same multimedia conference), and the sharing instruction includes but is not limited to identification information of the shared file and sharing range information. For convenience of description, a client triggering the sharing instruction may be called a sharer client in the embodiment of the present disclosure; then, the information sharing server may determine an uniform resource locator (URL) of the shared file according to the identification information of the shared file, and determine a sharing range specified by the sharing instruction from the communication range according to the sharing range information; finally, the information sharing server issues the URL of the shared file to other clients within the sharing range. For convenience of description, a client that may receive the URL of the shared file in the embodiment of the present disclosure is called a shared client, so that the shared client may access the URL of the shared file in the information sharing server and obtain file content of the shared file by accessing the URL, so that the shared client and the sharer client may display the file content of the shared file at the same time.

Further, the information sharing server may also issue an editing operation of the shared file by the sharer client to the shared client, and the editing operation includes but is not limited to operations supported by the shared file, such as scrolling, turning page, editing, annotating, deleting, selecting, zooming out, zooming in, partially highlighting and so on, so that the shared client may process the shared file displayed according to a received editing operation, thereby realizing that the shared client can follow the shared client to edit the shared file.

In a specific implementation, a client interface of the shared client may be set with a follow-sharer control. When the shared file is displayed on a window interface of the shared client, a current mode of the shared client may be adjusted to a follow mode through the triggering of the follow-sharer control. In the follow mode, the shared client can acquire the editing operation performed by the shared client on the shared file from the information sharing server, and process the displayed shared file according to the editing operation, so that the shared client can follow the sharer client to edit the shared file.

In addition, the client interface of the shared client may also be set with a free browsing control. When the shared file is displayed on the window interface of the shared client, the current mode of the shared client may be adjusted to a free browsing mode through the triggering of the free browsing control. In the free browsing mode, the shared client does not acquire the editing operation performed by the sharer client on the shared file, but can receive a browsing instruction that a user acts on the window interface, and display each page of the shared file according to the browsing instruction, so that the user can browse the shared file in the free browsing mode.

However, based on the information sharing method according to the embodiment of the present disclosure, when sharing files, the shared client cannot indicate a current information position of the sharer client, resulting in that a user of the shared client cannot perceive the current information position of the sharer client and cannot learn a sharing process, and even cannot perceive whether it is in the free browsing mode, resulting in poor user sharing experience. Therefore, the embodiment of the present disclosure provides an information indicating method, which can solve defects in the information sharing method involved in the embodiment of the present disclosure.

In the embodiment of the present disclosure, when a client triggers the sharing instruction to send the URL to other clients within the communication range through the information sharing server, the client may be considered as a sharer client; the same client, when it accesses the received URL, acquires and displays the shared file from the information sharing server, the client acts as a shared client. That is, the same client determines whether the client is a sharer client or a shared client based on whether it acts as a trigger client of the shared file. It can be understood that in different application scenarios, an identity of the same client may be a sharer client or a shared client.

After acquiring the shared file shared by the sharer client, the shared client can open the shared file in a window interface (which may be called a client interface) of an embedded browser of the client to display the shared file, in which the shared file may include at least one page. Here, the page may be understood as, for example, a part of the shared file presented in a current interface, and the current page may be understood as a page of the shared file currently displayed by the shared client in the free browsing mode. The shared file is also displayed on the sharer client, and the current page of the shared client and the page displayed at the same time of the sharer client may be the same page or different pages.

The first target information of the current page may include position information of the shared file, that is, position information of page content in the shared file, such as a line parameter or a page parameter of the page content in the shared file; and/or, the first target information may include position information of the client interface, such as a side scroll bar parameter in the client interface. The first position parameter may include at least one position parameter in the first target information. The shared client may acquire the first position parameter in real time, and may also acquire a changed first position parameter when the first position parameter of the current page changes.

S120: acquire a second position parameter of second target information in a display page of the sharer client.

In the embodiment of the present disclosure, the second target information of the display page of the sharer client may also include the position information of the shared file and/or the position information of the client interface. The sharer client may also acquire the second position parameter in real time, and may also acquire a changed second position parameter when the second position parameter of the display page changes. Moreover, after acquiring the second position parameter, the sharer client may send the second position parameter to the shared client through a server, so that the shared client receives the second position parameter.

In some application scenarios, a real-time determination of an indication identifier can be realized by acquiring the first position parameter and acquiring the second position parameter in real time. In other application scenarios, a dynamic update of the indication identifier can be realized by acquiring the first position parameter and/or acquiring the second position parameter when the first position parameter and/or the second position parameter change, so as to ensure accuracy of the indication identifier.

In an implementation, the first position parameter and the second position parameter are determined based on a same position parameter determination rule. For example, the position parameter determination rule may include any of the following: in a client presenting a shared file, determining the first position parameter and the second position parameter based on position information of the shared file presented at a first preset position of a client interface; or, in a client presenting a shared file, determining the first position parameter and the second position parameter based on position information of the shared file corresponding to a cursor in the shared file presented in a client interface.

In this embodiment, when the first position parameter and the second position parameter include the position information of the shared file, the first position parameter and the second position parameter may be determined according to the position information of the shared file presented at the first preset position of the client interface or a position where the cursor is located in the shared file. The first preset position is, for example, a center position or an upper left corner position of the client interface. The shared file presented at the position where the cursor is located is the shared file corresponding to the cursor, such as page content of a line where the cursor is located.

The first preset position and the position where the cursor is located may represent a position of page information concerned by a user. Exemplarily, page content at the center position of the client interface or page content of the line where the cursor is located may be regarded as content that the user is browsing or explaining. In addition, other positions that may represent a position of the page information concerned by a user may also be applied to the embodiment of the present disclosure, which are not exhaustively illustrated here. By determining the first position parameter and the second position parameter based on the same position parameter determination rule, it can be ensured that determination standards of position parameters are consistent, and the indication identifier determined according to the first position parameter and the second position parameter can thus be more accurate.

S130: determine the indication identifier according to the first position parameter and the second position parameter, and indicate the second target information according to the indication identifier.

In the embodiment of the present disclosure, the indication identifier may be determined according to a comparison result of the first position parameter and the second position parameter.

As an implementation manner, the indication identifier may be an indication direction. The indication direction may be a vertical direction (up or down) and/or a horizontal direction (left or right). In a specific embodiment, a direction in which a difference between the first position parameter and the second position parameter in the vertical direction and the horizontal direction is relatively small or large may be used as the indication direction. The second target information is indicated according to the indication direction, for example, the shared client may indicate the second target information of the sharer client by adding a direction identifier corresponding to the indication direction in the client interface. The direction identifier may be, for example, an arrow identifier. In addition, when the first position parameter is the same as the second position parameter, the second target information may not be indicated, for example, an arrow representing the indication direction may not be displayed.

By indicating a position of the second target information of the sharer client on the shared client, the current information position of the sharer client can be provided to the user of the shared client, which is beneficial to switch between information currently browsed and information explained by a user of the sharer client according to their personal needs, is also beneficial for the user of the shared client to learn a process of sharing the shared file by the user of the sharer client, and also gives an obvious mode prompt for the current free browsing mode of the shared client, thereby improving user sharing experience.

In an implementation, where the determining the indication identifier according to the first position parameter and the second position parameter includes: determining the indication identifier according to the first position parameter and the second position parameter based on an indication identifier determination mode corresponding to a file type of the shared file; or, determining the indication identifier according to the first position parameter and the second position parameter based on a file type of the shared file and an indication identifier determination mode corresponding to display states of the shared file in the shared client and the sharer client.

In this embodiment, the file type of the shared file includes but is not limited to document, spreadsheet, mind map, presentation, portable document or web page, and is not exhaustively illustrated here. The shared files of some file types have only one display state, and some file types may have two or more display states. When the shared file has only one display state, the indication identifier may be determined according to the first position parameter and the second position parameter based on the indication identifier determination mode corresponding to the file type of the shared file; when the shared file has two or more display states, the indication identifier may be determined according to the first position parameter and the second position parameter based on the file type of the shared file and the indication identifier determination mode corresponding to the display states of the shared file in the shared client and the shared client.

Further, the indication identifier determination mode includes at least one of the following: a line parameter comparison mode, a column parameter comparison mode, a page parameter comparison mode and a scroll bar parameter comparison mode of a client interface.

In this embodiment, the indication identifier determination modes corresponding to different file types or a shared file with different display states of the same file type may be the same or different, and corresponding indication identifier determination mode may include one or more modes among of a line parameter comparison mode, a column parameter comparison mode, a page parameter comparison mode and a scroll bar parameter comparison mode of the client interface. Based on different indication identifier determination modes, the indication identifiers obtained are also different. For example, the indication identifier obtained based on the line parameter comparison mode is usually in the vertical direction, and the indication identifier obtained based on the column parameter comparison mode is usually in the horizontal direction.

In an implementation, the information indicating method provided by the embodiment of the present disclosure is applied to a real-time interactive application, and the real-time interactive application includes at least one of an instant messaging application, a multimedia conference application, a live video application and a group chat interactive application.

In this embodiment, the sharer client and the shared client are clients of the real-time interactive applications, so that file sharing can be realized in a process of real-time interaction between clients, and the second target information of the sharer client can be indicated in the shared client, thereby not only enriching an interactive form of real-time interaction, but also improving sharing efficiency of information and user sharing experience.

According to the technical solutions of the embodiment of the present disclosure, after acquiring the shared file shared by the sharer client, the shared client can display the shared file simultaneously with the sharer client. In addition, in a process of browsing the shared file by the shared client, the first position parameter of the first target information in the current page can be acquired, and the second position parameter of the second target information in the display page of the sharer client can also be received. Further, the shared client can determine the indication identifier according to the first position parameter and the second position parameter, and indicate the second target information according to the indication identifier. By indicating the position of the second target information of the sharer client on the shared client, the current information position of the sharer client can be provided to the user of the shared client, which is beneficial for learning the sharing process and prompting the user of the current free browsing mode, thereby improving user sharing experience.

In addition, according to the information sharing technology involved in the information indicating method disclosed in the embodiment of the present disclosure, by sharing the page content of the shared file to the shared client, defects of network delay and decompression distortion in a traditional screen sharing technology can be overcome, thus realizing high fidelity and smooth information sharing, and improving user sharing experience.

Embodiment 2

The embodiments of the present disclosure may be combined with various optional solutions in the information indicating method provided in the above embodiments. In the information indicating method provided in this embodiment, an example is taken where an implementation manner of the indication identifier is an indication direction, and the indication direction determination modes corresponding to the shared files of multiple file types in one or more display states are specifically listed, so that the shared client can carry out different indication direction feedback for different file types or different display states of the same type, thereby improving user experience.

In an implementation, if the file type is a document type, determining the indication direction according to the first position parameter and the second position parameter based on a line parameter comparison mode corresponding to the document type.

In this embodiment, the shared file of the document type may be, for example, a Docs cloud file or a Word cloud file. Page content in the shared file of the document type may be set with continuously edited line numbers, and the first position parameter or the second position parameter may include a line number of the page content. Further, the shared client may determine the indication direction according to a line number difference between the first position parameter and the second position parameter based on the line parameter comparison mode.

Further, where the determining the indication direction according to the first position parameter and the second position parameter based on the line parameter comparison mode corresponding to the document type includes: comparing a first document line parameter in the first position parameter with a second document line parameter in the second position parameter; and determining the indication direction according to a comparison result of the first document line parameter and the second document line parameter.

In this embodiment, both the first document line parameter and the second document line parameter may be line numbers. Since pages of the shared file of the document type are usually displayed from top to bottom, the indication direction determined based on a line number comparison result is a vertical direction. Where the determining the indication direction according to the comparison result of the first document line parameter and the second document line parameter may be specifically as follows: if the first document line parameter is greater than the second document line parameter, determining the indication direction to be up since it can be considered that information explained by a user of the sharer client is higher than information browsed by a user of the shared client; if the first document line parameter is less than the second document line parameter, determining the indication direction to be down since it can be considered that information explained by the user of the sharer client is lower than information browsed by the user of the shared client. In addition, if the first document line parameter is the same as the second document line parameter, not indicating the second target information at this time since it can be considered that information explained by the user of the sharer client is the same as information browsed by the user of the shared client.

In an implementation, if the file type is a spreadsheet type, determining the indication direction according to the first position parameter and the second position parameter based on a line parameter comparison mode and/or a column parameter comparison mode corresponding to the spreadsheet type.

In this embodiment, the shared file of the spreadsheet type may be, for example, a Sheets cloud file or an Excel cloud file. The shared file of the spreadsheet type may include at least one table, each cell in each table may include a line number and a column number, and the first position parameter or the second position parameter may include a line number and a column number of a cell. Further, the shared client can determine the indication direction according to a line number difference and/or a column number difference between the first position parameter and the second position parameter based on the line parameter comparison mode and/or the column parameter comparison mode.

Further, where the determining the indication direction according to the first position parameter and the second position parameter based on the line parameter comparison mode and/or the column parameter comparison mode corresponding to the spreadsheet type includes: calculating a line difference value between a first table line parameter in the first position parameter and a second table line parameter in the second position parameter; calculating a column difference value between a first table column parameter in the first position parameter and a second table column parameter in the second position parameter; and determining the indication direction according to the line difference value and/or the column difference value.

In this embodiment, both the first table line parameter and the second table line parameter may be line numbers, and both the first table column parameter and the second table column parameter may be column numbers. After calculating the line difference value and the column difference value, the determining the indication direction according to the line difference value and/or the column difference value may be specifically as follows: determining two indication directions according to the line difference value and the column difference value, or determining one indication direction according to one of the line difference and the column difference. Moreover, the indication direction determined according to the line difference is the vertical direction, and the indication direction determined according to the column difference is the horizontal direction.

Further, where the determining the indication identifier according to the line difference value and/or the column difference value includes:

comparing an absolute value of the line difference value with an absolute value of the column difference value; determining the indication direction based on the line difference value when the absolute value of the line difference value is greater than the absolute value of the column difference value; determining the indication direction based on the column difference value when the absolute value of the line difference value is less than the absolute value of the column difference value; and determining the indication direction according to a difference value with a higher priority in the line difference value and the column difference value when the absolute value of the line difference value is equal to the absolute value of the column difference value.

In this embodiment, the shared client may determine the indication direction based on the one with a larger absolute value of the line difference value and the column difference value. Because the line numbers of cells in the shared file of the spreadsheet type increase from top to bottom and the column numbers increase from left to right, the indication direction determined based on the line difference value is the vertical direction and the indication direction determined based on the column difference value is the horizontal direction.

Where the determining the indication direction based on the line difference value may specifically be: if the line difference value is greater than zero, determining the indication direction to be up since it can be considered that information explained by the user of the sharer client is higher than information browsed by the user of the shared client; if the line difference value is less than zero, determining the indication direction to be down since it can be considered that information explained by the user of the sharer client is lower than information browsed by the user of the shared client.

Where the determining the indication direction based on the column difference value may specifically be: if the column difference value is greater than zero, determining the indication direction to be left since it can be considered that information explained by the user of the sharer client is on the left relative to information browsed by the user of the shared client; if the column difference value is less than zero, determining the indication direction to be right since it can be considered that information explained by the user of the sharer client is on the right relative to information browsed by the user of the shared client.

If the line difference value and the column difference value are zero, it can be considered that information explained by the user of the sharer client is the same as information browsed by the user of the shared client, and the second target information may not be indicated at this time. In addition, when the absolute value of the line difference value is equal to the absolute value of the column difference value, if the line difference value is the difference value with a higher priority, the indication direction is determined based on the line difference value, and if the column difference is the difference value with a higher priority, the indication direction is determined based on the column difference value.

In an implementation, before calculating the line difference value and the column difference value, further including: judging whether a table identifier in the first position parameter is the same as a table identifier in the second position parameter; if so, calculating the line difference value and the column difference value.

In this embodiment, for each shared file of the spreadsheet type, a table identifier may uniquely correspond to a table in the shared file. The table identifier may be composed of at least one element such as a text, a number, a letter and a symbol, such as "Table 1" or "Tab1". If a table displayed by the sharer client and a current table of the shared client are the same table, a table identifier in the first position parameter and a table identifier in the second position parameter are the same; if the table displayed by the sharer client is different from the current table of the shared client, the table identifier in the first position parameter is different from the table identifier in the second position parameter. The shared client may calculate the line difference value and the column difference value when the sharer client and the shared client display the same table; when the sharer client and the shared client display different tables, the line difference value and the column difference value are not calculated, so as to avoid an error in the calculation of the indication direction when different tables are displayed.

In a specific embodiment, when the table identifier in the first position parameter and the table identifier in the second position parameter are both identifiers of a main table, the line difference value and the column difference value can be calculated, thereby saving computing resources.

In an implementation, if the file type is a mind map type, determining the indication direction according to the first position parameter and the second position parameter based on the mind map type and a line parameter comparison mode corresponding to display states of the shared file in the shared client and the sharer client.

In this embodiment, the shared file of the mind map type may be, for example, a Mindnotes cloud file. The display states of the shared file of the mind map type may include at least two modes: a brain map view mode and an outline view mode. The brain map view mode may be considered as a mode in which a relationship among subjects at all levels is shown in a hierarchical diagram of mutual subordination and correlation, where the hierarchical diagram may be a tree diagram; the outline view mode may be considered as a list mode of folding/expanding a sub-subject under a subject in response to a folding/expanding instruction, and each subject in the list mode may be set with a line number.

Since the hierarchical diagram in the brain map view mode has no obvious position parameters such as a line and a column, if the display states of the shared file in the shared client and the sharer client include the brain map view mode, the indication direction may not be determined. However, since a subject line number may be set in a subject list in the outline view mode, if the display states of the shared file in the shared client and the sharer client are the outline view mode, the indication direction may be determined according to the subject line number difference between the first position parameter and the second position parameter according to the line parameter comparison mode.

Further, where the determining the indication direction according to the first position parameter and the second position parameter based on the mind map type and the line parameter comparison mode corresponding to the display states of the shared file in the shared client and the sharer client includes: judging whether the display state of the shared file in the shared client and the display state of the shared file in the sharer client are both in the outline view mode; where the outline view mode is a mode of folding/expanding a sub-subject under a subject in response to a folding/expanding instruction; if so, comparing a first subject line parameter in the first position parameter with a second subject line parameter in the second position parameter; determining the indication direction according to a comparison result of the first subject line parameter and a second subject line parameter.

In this embodiment, both the first subject line parameter and the second subject line parameter may be subject line numbers. Since the subject line numbers in the outliner mode increase sequentially from top to bottom, the indication direction determined based on the line number is the vertical direction. Where the determining the indication direction according to the comparison result of the first subject line parameter and the second subject line parameter may specifically be: if the first subject line parameter is greater than the second subject line parameter, determining the indication direction to be up since it can be considered that information explained by the user of the sharer client is higher than information browsed by the user of the shared client; if the first subject line parameter is less than the second subject line parameter, determining the indication direction to be down since it can be considered that information explained by the user of the sharer client is lower than information browsed by the user of the shared client. In addition, if the first subject line parameter is the same as the second subject line parameter, not indicating the second target information at this time since it can be considered that information explained by the user of the sharer client is the same as information browsed by the user of the shared client.

In an implementation, if the file type is a presentation type, determining the indication direction according to the first position parameter and the second position parameter based on the presentation type and a page parameter comparison mode corresponding to display states of the shared file in the shared client and the sharer client.

In this embodiment, the shared file of the presentation type may be, for example, a Slides cloud file or a PPT cloud file. The shared file of the presentation type may include at least one slide, and each slide may be set with a page number. Display states of the Slides cloud file and PPT cloud file include a showing state and a non-showing state. If the display states of the shared file in the shared client and the sharer client are different, the indication direction may not be determined; if the display states of the shared file in the shared client and the sharer client are the same, the indication direction may be determined according to a page number difference in the first position parameter and the second position parameter based on the page parameter comparison mode.

Further, where the determining the indication direction according to the first position parameter and the second position parameter based on the presentation type and the page parameter comparison mode corresponding to the display states of the shared file in the shared client and the sharer client includes: judging whether the display state of the shared file in the shared client is the same as the display state of the shared file in the sharer client; if so, comparing a first document page parameter in the first position parameter with a second document page parameter in the second position parameter; determining the indication direction according to a comparison result of the first document page parameter and the second document page parameter.

In this embodiment, both the first document page parameter and the second document page parameter may be page numbers. Since the shared file of the presentation type is in the showing state, the client interface of the client shows one slide at a time, and the indication direction may be determined according to a switching direction between slides. For example, if a slide with a large page number enters the client interface from a right side, the indication direction determined based on a page number comparison result is the horizontal direction. If a slide with a large page number enters the client interface from a lower side, the indication direction determined based on the page number comparison result is the vertical direction. Since the shared file of the presentation type is in the non-showing state, slides are usually displayed in an order of page numbers from top to bottom, and the indication direction determined based on the page number comparison result is the vertical direction.

Exemplarily, when the display states are both the showing state and a slide with a large page number enters the interface from a right side, the determining the indication direction according to a comparison result of the first document page parameter and the second document page parameter may be specifically as follows: if the first document page parameter is greater than the second document page parameter, determining the indication direction to be left since it can be considered that information explained by the user of the sharer client is on the left relative to information browsed by the user of the shared client; if the first document page parameter is less than the second document page parameter, determining the indication direction to be right since it can be considered that information explained by the user of the sharer client is on the right relative to information browsed by the user of the shared client.

Exemplarily, when the display states are both the non-showing state, the determining the indication direction according to a comparison result of the first document page parameter and the second document page parameter may be specifically as follows: if the first document page parameters is greater than the second document page parameter, determining the indication direction to be up since it can be considered that information explained by the user of the sharer client is higher than information browsed by the user of the shared client; if the first document page parameter is less than the second document page parameter, determining the indication direction to be down since it can be considered that information explained by the user of the sharer client is lower than information browsed by the user of the shared client. In addition, if the first document page parameter is the same as the second document page parameter, not indicating the second target information at this time since it can be considered that information explained by the user of the sharer client is the same as information browsed by the user of the shared client.

In an implementation, if the file type is a portable document type, determining the indication direction according to the first position parameter and the second position parameter based on a page parameter comparison mode corresponding to the portable document type.

In this embodiment, the shared file of the portable document type may be, for example, a PDF cloud file. The shared file of the portable document type may include at least one page, and each page may be set with a page number. Further, the shared client may determine the indication direction according to a page number difference between the first position parameter and the second position parameter based on the page parameter comparison mode.

Further, where the determining the indication direction according to the first position parameter and the second position parameter based on the page parameter comparison mode corresponding to the portable document type includes: comparing a first document page parameter in the first position parameter with a second document page parameter in the second position parameter; and determining the indication direction according to a comparison result of the first document page parameter and the second document page parameter.

In this embodiment, both the first document page parameter and the second document page parameter may be page numbers. Since pages of the shared file of the portable document type are usually displayed from top to bottom, the indication direction determined based on a page number comparison result is the vertical direction. Where the determining the indication direction according to the comparison result of the first document page parameter and the second document page parameter may be specifically as follows: if the first document page parameter is greater than the second document page parameter, determining the indication direction to be up since it can be considered that information explained by the user of the sharer client is higher than information browsed by the user of the shared client; if the first document page parameter is less than the second document page parameter, determining the indication direction to be down since it can be considered that information explained by the user of the sharer client is lower than information browsed by the user of the shared client. In addition, if the first document page parameter is the same as the second document page parameters, not indicating the second target information at this time since it can be considered that information explained by the user of the sharer client is the same as information browsed by the user of the shared client.

In an implementation, if the file type is a web page type, determining the indication direction according to the first position parameter and the second position parameter based on a scroll bar parameter comparison mode of a client interface corresponding to the web page type.

In this embodiment, the shared file of the web page type may be, for example, any website page. The shared file of the web page type is usually a page which is displayed on the client interface and may be scrolled up and down, and a scroll bar may be set on a side of the client interface. Further, the shared client may determine the indication direction according to a scroll bar position difference between the first position parameter and the second position parameter based on the scroll bar parameter comparison mode.

Further, where the determining the indication direction according to the first position parameter and the second position parameter based on the scroll bar parameter comparison mode of the client interface corresponding to the web page type includes: comparing a first scroll bar position parameter relative to a client interface in the first position parameter with a second scroll bar position parameter relative to a client interface in the second position parameter; and determining the indication direction according to a comparison result of the first scroll bar position parameter and the second scroll bar position parameter.

In this embodiment, due to a difference in longitudinal sizes of client interfaces of different clients, both the first scroll bar position parameter and the second scroll bar position parameter may be position parameters of scroll bars relative to the longitudinal sizes of the client interfaces of clients where the scroll bars are located, which is convenient for comparison of the scroll bar position parameters of client interfaces with different sizes. Generally, a scroll track is set longitudinally along the client interface of the client, so a manner of determining the scroll bar position parameter may be to take a proportion of a distance from the scroll bar to a top of the scroll track to a size of the whole scroll track as the scroll bar position parameter.

Since page content of the shared file of the web page type is usually viewed from top to bottom by virtue of the scroll bar, the indication direction determined based on a comparison result of the scroll bar position parameters is the vertical direction. Where the determining the indication direction according to the comparison result of the first scroll bar position parameter and the second scroll bar position parameter may be specifically as follows: if the first scroll bar position parameter is greater than the second scroll bar position parameter, determining the indication direction to be up since it can be considered that information explained by the user of the sharer client is higher than information browsed by the user of the shared client; if the first scroll bar position parameter is less than the second scroll bar position parameter, determining the indication direction to be down since it can be considered that information explained by the user of the sharer client is lower than information browsed by the user of the shared client. In addition, if the first scroll bar position parameter is the same as the second scroll bar position parameter, not indicating the second target information at this time since it can be considered that information explained by the user of the sharer client is the same as information browsed by the user of the shared client.

In the technical solutions of the embodiment of the present disclosure, determination manners of the indication direction in one or more display states are listed in cases where a document type of a shared file is document, spreadsheet, mind map, presentation, portable document and web page respectively, and different indication directions are obtained based on different determination manners of the indication direction, thereby enabling the shared client to give different indication direction feedback for different file types or different display states of the same type, and improving user experience.

Embodiment 3

Figure 2:
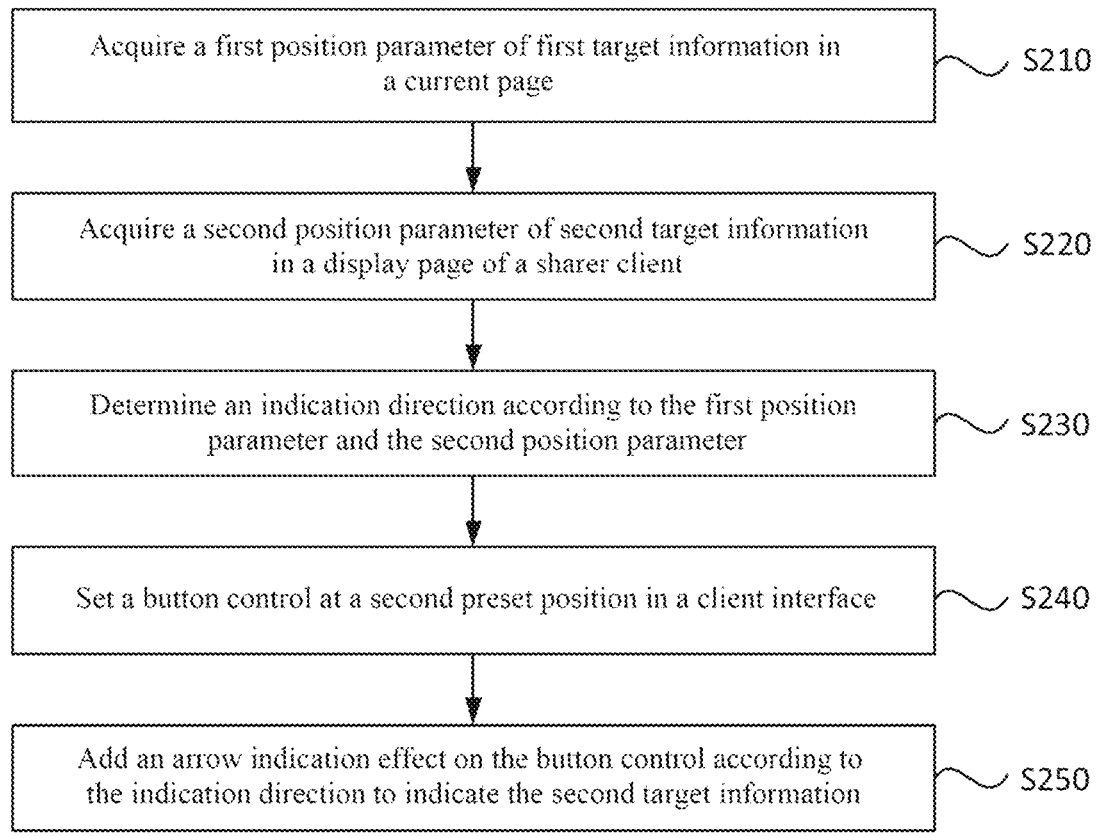
FIG. 2 is a schematic flowchart of an information indicating method provided in Embodiment 3 of the present disclosure.

FIG. 2 is a schematic flowchart of an information indicating method provided in Embodiment 3 of the present disclosure. The present embodiment may be combined with each optional solution in the above embodiment. In the information indicating method provided in this embodiment, the indication mode of the indication direction is optimized and the position indication effect is improved.

As shown in FIG. 2, the information indicating method provided by the present embodiment includes the following steps.

S210: acquire a first position parameter of first target information in a current page.

The current page is a page in a shared file shared by a sharer client.

S220: acquire a second position parameter of second target information in a display page of the sharer client.

S230: determine an indication identifier according to the first position parameter and the second position parameter.

S240: set a button control at a second preset position in a client interface. In this embodiment, the second preset position may be a position on a side of the client interface to avoid blocking page information of the shared file. The second preset position may specifically be a middle position on the side of the client interface, which is beneficial to realize a more obvious prompt of a current information position of the sharer client and a prompt of a free browsing mode.

S250: add an arrow indication effect on the button control according to the indication direction to indicate the second target information.

In this embodiment, the arrow indication effect corresponding to the indication direction may be added to the button control, so that the shared client can indicate the second target information of the sharer client, which may be considered as indicating a current position of information explained by the sharer client. When the indication direction is up/down/left/right, the adding the corresponding arrow indication effect may be, adding an arrow pointing up/down/left/right on the up/down/left/right side of the button control, in which a style and a color of the arrow may be defined in advance.

In addition, when there is no need to indicate the second target information, that is, when the determined indication direction is empty, it is possible to merely display the button control without adding the arrow indication effect on the button control, which can not only show a more obvious prompt to the free browsing mode, but also prompt the user of the fact that the first position parameter and the second position parameter are the same, so that the user can learn information currently browsed is information explained by the user of the sharer client.

In an implementation, the button control is displayed with an identity of the sharer client. The identity of the sharer client may be an identity such as an avatar and a name of the sharer client. In this way, a more obvious prompt of the identity of the sharer client is implemented.

In an implementation, switching to a follow mode in response to a click instruction for the indication control, where the follow mode is a mode of following and displaying a display page of the sharer client.

In this embodiment, a plurality of follow-sharer controls may be set in the client interface of the shared client, and the button control may be used as one of the follow-sharer controls. When the shared client detects a trigger operation (such as a click operation) for the follow-sharer control, it may switch from the free browsing mode to the follow mode. In the follow mode, the shared client can acquire page content of a current display page of the sharer client, and acquire an operation such as scrolling up and down or editing the page content of the sharer client, so as to follow the current display page of the sharer client, and follow the sharer client to scroll the page or edit the page content.

Further, in the follow mode, stopping acquiring the first position parameter, acquiring the second position parameter, and determining the indication identifier according to the first position parameter and the second position parameter.

It should be noted that in this embodiment, the button control is taken as an example for description. It should be understood that the button control is only an implementation manner of the indication control. When other types of controls are used as the indication control to implement the technical solutions of the present disclosure, the specific implementation process and principle are similar to those of the button control, which will not be repeated here.

In addition, in this embodiment, the indication direction is taken as an example. It should be understood that the indication direction is only an implementation manner of the indication identifier. When other identifiers are used as the indication identifier to implement the technical solutions of the present disclosure, the specific implementation process and principle are similar to those of the indication direction, which will not be repeated here.

When the shared client is switched to the follow mode, since the shared client follows and displays what the shared client displays, the first position parameter is always equal to the second position parameter, and the determined indication direction is always no guidance. At this time, stopping acquiring the first position parameter, acquiring the second position parameter, and determining the indication identifier according to the first position parameter and the second position parameter, so as to save computing resources. Correspondingly, the button control does not need to be set in the client interface at this time, so that the user can understand that he is not in the free browsing mode.

Figure 3:
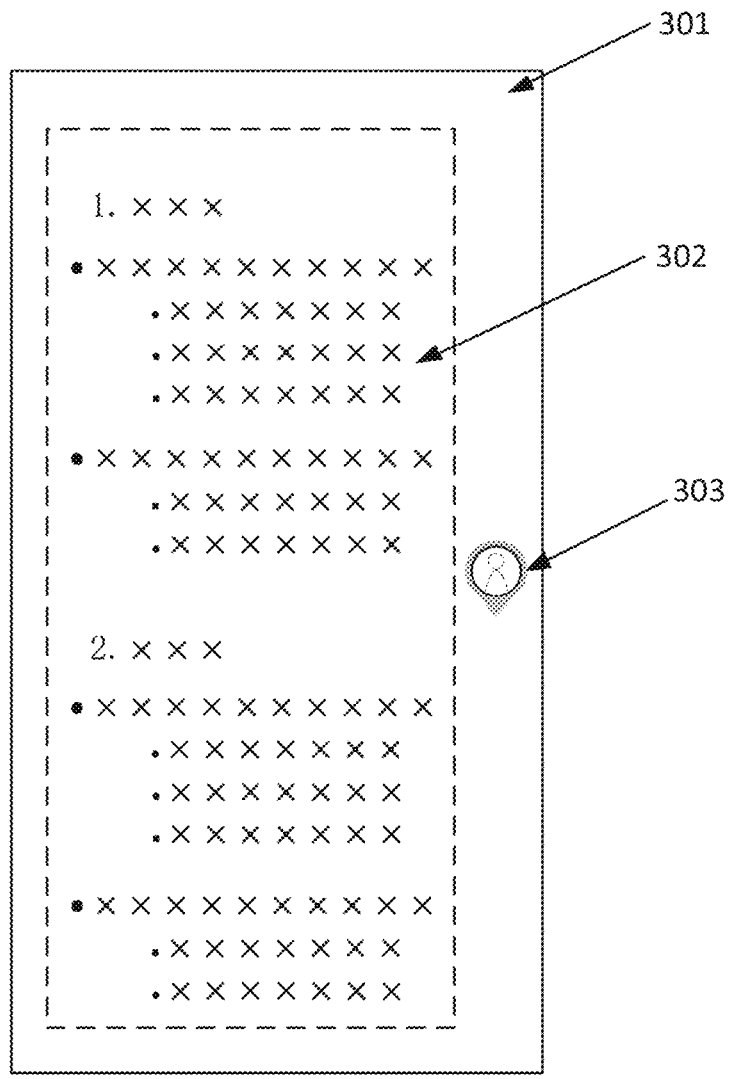
FIG. 3 is a schematic diagram of an interface of a shared client in an information indicating method provided in Embodiment 3 of the present disclosure.

FIG. 3 is a schematic diagram of an interface of a shared client in an information indicating method provided in Embodiment 3 of the present disclosure.

As shown in FIG. 3, page content 302 of a shared file is displayed in a window interface (i.e., the client interface) 301 of an embedded browser in the shared client. In the free browsing mode, a button control 303 is also set in a middle position on a right side of the client interface. The button control 303 may display an avatar of the sharer client, and add a downward arrow on a lower side of the button control to prompt that information explained by a user of the sharer client is lower than information browsed by a user of the shared client, so as to realize indication of the second target information of the sharer client, provide the user of the shared client with a current information position of the sharer client, help the user to learn a sharing process, and prompt the user of the current free browsing mode, so as to improve user sharing experience.

In addition, the shared client may switch from the free browsing mode to the follow mode in response to a click instruction for the button control 303, so as to follow and display the current display page of the sharer client, and follow the sharer client to scroll the page or edit the page content.

In the technical solution of the embodiment of the present disclosure, the indication of the second target information is realized by setting the button control and adding the arrow indication effect corresponding to the indication direction on the button control. In addition, the indication effect can be further optimized by displaying the identity of the sharer client on the button control; a more flexible and vivid mode switching mode can be achieved by switching to follow mode in response to the click instruction for the button control, thereby improving the user experience.

Embodiment 4

Figure 4:
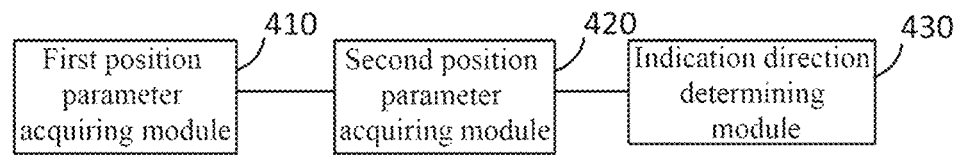
FIG. 4 is a schematic structural diagram of an information indicating apparatus provided in Embodiment 4 of the present disclosure.

FIG. 4 is a schematic structural diagram of an information indicating apparatus provided in Embodiment 4 of the present disclosure. The information indicating apparatus provided in this embodiment is particularly suitable for indicating a current position of information explained at a sharer client on an interface of a shared client when the shared client freely browses a shared file shared by the sharer client.

As shown in FIG. 4, the information indicating apparatus includes:
 a first position parameter acquiring module 410, configured to acquire a first position parameter of first target information in a current page, where the current page is a page in a shared file shared by a sharer client;
 a second position parameter acquiring module 420, configured to acquire a second position parameter of second target information in a display page of the sharer client; and
 an indication identifier determining module 430, configured to determine an indication identifier according to the first position parameter and the second position parameter, and indicate the second target information according to the indication identifier.

In an implementation, the first position parameter and the second position parameter are determined based on a same position parameter determination rule.

In an implementation, the position parameter determination rule includes any of the following:
 in a client presenting a shared file, determining the first position parameter and the second position parameter based on position information of the shared file presented at a first preset position of a client interface; or,
 in a client presenting a shared file, determining the first position parameter and the second position parameter based on position information of the shared file corresponding to a cursor in the shared file presented in a client interface.

In an implementation, the indication identifier determining module is specifically configured to:
 determine the indication identifier according to the first position parameter and the second position parameter based on an indication identifier determination mode corresponding to a file type of the shared file; or,
 determine the indication identifier according to the first position parameter and the second position parameter based on a file type of the shared file and an indication identifier determination mode corresponding to display states of the shared file in the shared client and the sharer client.

In an implementation, the indication identifier determination mode includes at least one of the following:
a line parameter comparison mode, a column parameter comparison mode, a page parameter comparison mode and a scroll bar parameter comparison mode of a client interface.

In an implementation, the indication identifier determining module is specifically configured to:
if the file type is a document type, determine the indication identifier according to the first position parameter and the second position parameter based on a line parameter comparison mode corresponding to the document type.

Further, the determining the indication identifier according to the first position parameter and the second position parameter based on the line parameter comparison mode corresponding to the document type includes:
comparing a first document line parameter in the first position parameter with a second document line parameter in the second position parameter; and
determining the indication identifier according to a comparison result of the first document line parameter and the second document line parameter.

In an implementation, the indication identifier determining module is specifically configured to:
if the file type is a spreadsheet type, determine the indication identifier according to the first position parameter and the second position parameter based on a line parameter comparison mode and/or a column parameter comparison mode corresponding to the spreadsheet type.

In an implementation, the determining the indication identifier according to the first position parameter and the second position parameter based on the line parameter comparison mode and/or the column parameter comparison mode corresponding to the spreadsheet type includes:
calculating a line difference value between a first table line parameter in the first position parameter and a second table line parameter in the second position parameter;
calculating a column difference value between a first table column parameter in the first position parameter and a second table column parameter in the second position parameter; and
determining the indication identifier according to the line difference value and/or the column difference value.

Further, the determining the indication identifier according to the line difference value and/or the column difference value includes:
comparing an absolute value of the line difference value with an absolute value of the column difference value;
determining the indication identifier based on the line difference value when the absolute value of the line difference value is greater than the absolute value of the column difference value;
determining the indication identifier based on the column difference value when the absolute value of the line difference value is less than the absolute value of the column difference value; and
determining the indication identifier according to a difference value with a higher priority in the line difference value and the column difference value when the absolute value of the line difference value is equal to the absolute value of the column difference value.

In an implementation, before calculating the line difference value and the column difference value, further including:
judging whether a table identifier in the first position parameter is the same as a table identifier in the second position parameter; and
if so, calculating the line difference value and the column difference value.

In an implementation, the indication identifier determining module is specifically configured to:
if the file type is a mind map type, determine the indication identifier according to the first position parameter and the second position parameter based on the mind map type and a line parameter comparison mode corresponding to display states of the shared file in the shared client and the sharer client.

In an implementation, the determining the indication identifier according to the first position parameter and the second position parameter based on the mind map type and the line parameter comparison mode corresponding to the display states of the shared file in the shared client and the sharer client includes:
judging whether the display state of the shared file in the shared client and the display state of the shared file in the sharer client are both in an outline view mode, where the outline view mode is a mode of folding/expanding a sub-subject under a subject in response to a folding/expanding instruction;
if so, comparing a first subject line parameter in the first position parameter with a second subject line parameter in the second position parameter; and
determining the indication identifier according to a comparison result of the first subject line parameter and the second subject line parameter.

In an implementation, the indication identification determining module is specifically configured to:
if the file type is a presentation type, determine the indication identifier according to the first position parameter and the second position parameter based on the presentation type and a page parameter comparison mode corresponding to display states of the shared file in the shared client and the sharer client.

In an implementation, the determining the indication identifier according to the first position parameter and the second position parameter based on the presentation type and the page parameter comparison mode corresponding to the display states of the shared file in the shared client and the sharer client includes:
judging whether the display state of the shared file in the shared client is the same as the display state of the shared file in the sharer client;
if so, comparing a first document page parameter in the first position parameter with a second document page parameter in the second position parameter; and
determining the indication identifier according to a comparison result of the first document page parameter and the second document page parameter In an implementation, the indication identifier determining module is specifically configured to:
if the file type is a portable document type, determine the indication identifier according to the first position parameter and the second position parameter based on a page parameter comparison mode corresponding to the portable document type.

In an implementation, the determining the indication identifier according to the first position parameter and the second position parameter based on the page parameter comparison mode corresponding to the portable document type includes:
  comparing a first document page parameter in the first position parameter with a second document page parameter in the second position parameter; and
  determining the indication identifier according to a comparison result of the first document page parameter and the second document page parameter.

In an implementation, the indication identification determining module is specifically configured to:
  if the file type is a web page type, determine the indication identifier according to the first position parameter and the second position parameter based on a scroll bar parameter comparison mode of a client interface corresponding to the web page type.

In an implementation, the determining the indication identifier according to the first position parameter and the second position parameter based on the scroll bar parameter comparison mode of the client interface corresponding to the web page type includes:
  comparing a first scroll bar position parameter relative to a client interface in the first position parameter with a second scroll bar position parameter relative to a client interface in the second position parameter; and
  determining the indication identifier according to a comparison result of the first scroll bar position parameter and the second scroll bar position parameter.

In an implementation, the indication identifier may be an indicator direction.

In an implementation, the indicating the second target information according to the indication identifier includes:
  setting an indication control at a second preset position in a client interface; and
  adding an arrow indication effect on the indication control according to the indication direction to indicate the second target information.

Further, the indication control is displayed with an identity of the sharer client.

In an implementation, the information indicating apparatus further includes:
  a mode switching module, configured to switch to a follow mode in response to a click instruction for the indication control, where the follow mode is a mode of following and displaying a display page of the sharer client.

In an implementation, in the follow mode, the information indicating apparatus is configured to:
  stop acquiring the first position parameter, acquiring the second position parameter, and determining the indication identifier according to the first position parameter and the second position parameter in the follow mode.

In an implementation, the indication control is a button control.

In an implementation, the information indicating apparatus is applied to a real-time interactive application, and the real-time interactive application includes at least one of an instant messaging application, a multimedia conference application, a live video application and a group chat interactive application.

In an implementation, the current page is a page presented by a shared client.

The information indicating apparatus provided by the embodiment of the present disclosure can execute the information indicating method provided by any embodiment of the present disclosure, and has functional modules and beneficial effects corresponding to the execution method.

It should be noted that units and modules included in the above apparatus are only divided according to functional logic, but are not limited to above division, as long as corresponding functions can be implemented; in addition, specific names of the functional units are only for mutual distinction and are not used to limit the protection scope of the embodiments of the present disclosure.

Embodiment 5

Figure 5:
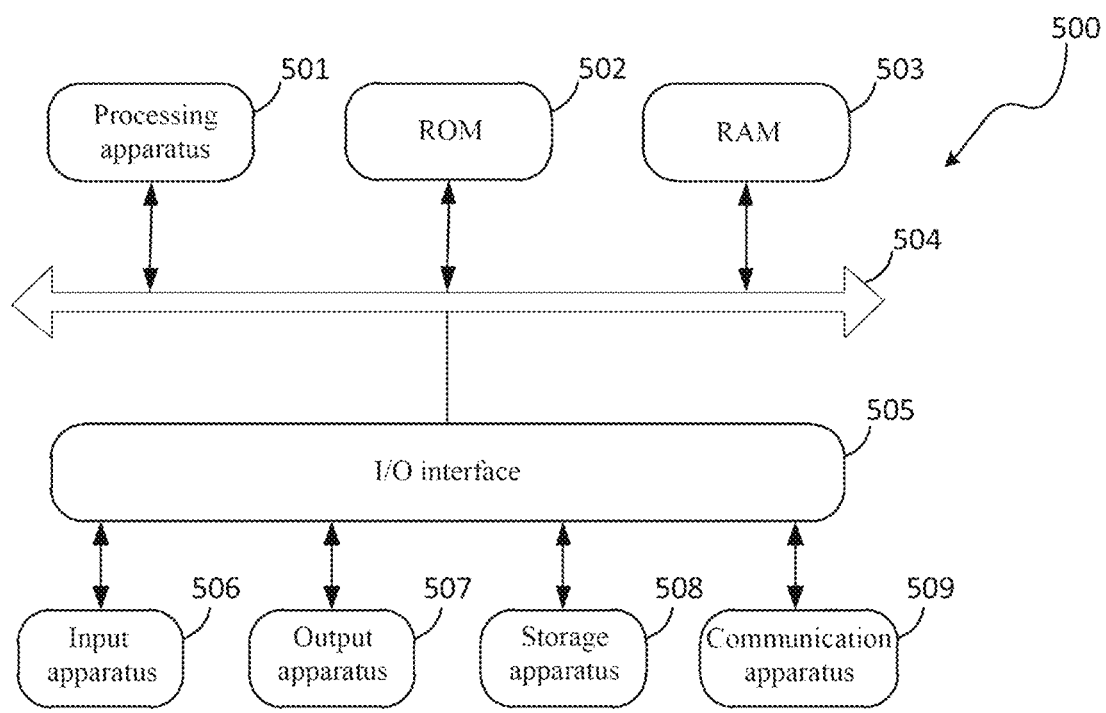
FIG. 5 is a schematic structural diagram of an electronic device provided in Embodiment 5 of the present disclosure.

Referring to FIG. 5 now, it shows a schematic structural diagram of an electronic device (such as a terminal device or a server in FIG. 5) 500 suitable for implementing an embodiment of the present disclosure. The terminal device in the embodiment of the present disclosure may include, but is not limited to a mobile terminal such as, a mobile phone, a laptop, a digital broadcast receiver, a personal digital assistant (PDA), a portable android device (PAD), a portable media player (PMP), an in-vehicle terminal (for example, in-vehicle navigation terminal) and a fixed terminal such as a digital TV (Television), a desktop computer and so on. The electronic device shown in FIG. 5 is only an example and should not impose any restriction on the function and scope of use of the embodiments of the present disclosure.

As shown in FIG. 5, the electronic device 500 may include a processing apparatus (for example, a central processing unit, a graphics processor, etc.) 501, which may execute various appropriate actions and processes according to a program stored in a read-only memory (ROM) 502 or a program loaded from a storage apparatus 506 into a random access memory (RAM) 503. Various programs and data required for an operation of the electronic device 500 are also stored in the RAM 503. The processing apparatus 501, the ROM 502 and the RAM 503 are connected to each other through a bus 504. An input/output (I/O) interface 505 is also connected to the bus 504.

Generally, the following apparatus may be connected to the I/O interface 505: an input apparatus 506 including, for example, a touch screen, a touch pad, a keyboard, a mouse, a camera, a microphone, an accelerometer, a gyroscope, etc.; an output apparatus 507 including, for example, a liquid crystal display (LCD), a speaker, a vibrator, etc.; a storage apparatus 508 including, for example, a magnetic tape, a hard disk, etc.; and a communication apparatus 509. The communication apparatus 509 may allow the electronic device 500 to communicate wirelessly or through wires with other devices to exchange data. Although FIG. 5 shows the electronic device 500 having various apparatuses, it should be understood that not all of the illustrated apparatuses are required to be implemented or provided. More or fewer apparatuses may alternatively be implemented or provided.

In particular, according to an embodiment of the present disclosure, a process described above with reference to flowcharts may be implemented as a computer software program. For example, embodiments of the present disclosure include a computer program product including a computer program carried on a non-transitory computer-readable medium, the computer program including a program code for executing the method illustrated in the flowcharts. In such an embodiment, the computer program may be downloaded and installed from a network through the communication apparatus 509, or installed from the storage apparatus 506, or installed from the ROM 502. When the computer program is executed by the processing apparatus 501, steps in the method of the embodiment of the present disclosure are executed to implement the above defined functions.

The electronic device provided by the embodiment of the present disclosure belongs to a same disclosure concept as the information indicating method provided by the above embodiment. For technical details not described in detail in the present embodiment, reference may be made to the above embodiment, and the present embodiment has same beneficial effect as the above embodiment.

Embodiment 6

The embodiment of the present disclosure provides a computer storage medium on which a computer program is stored, and when the program is executed by a processor, the information indicating method provided by the above embodiment is implemented.

It should be noted that the computer-readable medium of the present disclosure may be a computer-readable signal medium or a computer-readable storage medium, or any combination of the above two. The computer-readable storage medium may be, for example, but is not limited to, an electrical, a magnetic, an optical, an electromagnetic, an infrared, or a semiconductor system, apparatus, or device, or any combination of the above. More specific examples of computer-readable storage medium may include, but are not limited to, an electrical connection with one or more wires, a portable computer disk, a hard disk, a random access memory (RAM), a read only memory (ROM), an erasable programmable read-only memory (EPROM) or a flash, an optical fiber, a compact disc read only memory (CD-ROM), an optical storage device, a magnetic storage device, or any suitable combination of the above. In the present disclosure, the computer-readable storage medium may be any tangible medium containing or storing a program, and the program may be used by or in combination with an instruction execution system, apparatus or device. In the present disclosure, the computer-readable signal medium may include a data signal propagated in a baseband or as a part of a carrier wave, in which a computer-readable program code is carried. Such propagated data signal may take a variety of forms, including but not limited to an electromagnetic signal, an optical signal or any suitable combination of the above. The computer-readable signal medium may also be any computer-readable medium other than a computer-readable storage medium, and the computer-readable signal medium may send, propagate, or transmit a program for use by or in combination with an instruction execution system, apparatus, or device. The program code included on the computer-readable medium may be transmitted with any suitable medium, including but not limited to: wire, optical cable, radio frequency (RF), etc., or any suitable combination of the above.

In some embodiments, a client and a server may communicate using any currently known or future developed network protocol such as HTTP (Hyper Text Transfer Protocol), and may communicate and interconnect with any form or medium of digital data (for example, communication network). Examples of communication network include a local area network (LAN), a wide area network (WAN), an Internet, and an end-to-end network (for example, an ad hoc end-to-end network), and any currently known or future developed network.

The computer-readable medium may be included in the electronic device; or may also exist alone without being assembled into the electronic device.

The computer-readable medium carries one or more programs, and when the one or more programs are executed by the electronic device, the electronic device is made to:

acquire a first position parameter of first target information in a current page, where the current page is a page in a shared file shared by a sharer client; acquire a second position parameter of second target information in a display page of the sharer client; and determine an indication identifier according to the first position parameter and the second position parameter, and indicate the second target information according to the indication identifier.

Computer program codes for performing operations of the present disclosure may be written in one or more programming languages or combinations thereof, including but not limited to object-oriented programming languages such as Java, Smalltalk, C++, and conventional procedural programming languages such as "C" language or similar programming languages. The program code may be executed completely on a users computer, partially on a user's computer, as a separate software package, partially on a users computer and partially on a remote computer, or completely on a remote computer or a server. In a case of the remote computer, the remote computer may be connected to the user computer through any kind of network, including a local area network (LAN) or a wide area network (WAN), or may be connected to an external computer (for example, through the Internet using an Internet service provider).

The embodiment of the present disclosure also provides a computer program product including a computer program, where the computer program is stored in a readable storage medium, one or more processors of an electronic device may read the computer program from the readable storage medium, and the one or more processors execute the computer program to cause the electronic device to execute the solution provided by any of the above embodiments.

The embodiment of the present disclosure also provides a computer program stored in a readable storage medium, one or more processors of an electronic device may read the computer program from the readable storage medium, and the one or more processors execute the computer program to cause the electronic device to execute the solution provided by any of the above embodiments.

The flowcharts and block diagrams in the accompanying drawings illustrate possible architectures, functions and operations of systems, methods and computer program products according to various embodiments of the present disclosure. In this regard, each block in a flowchart or a block diagram may represent a module, a program segment, or a part of code that includes one or more executable instructions for implementing a specified logical function. It should also be noted that in some alternative implementations, the functions marked in the blocks may also occur in a different order than those marked in the drawings. For example, two blocks represented successively may actually be executed basically in parallel, or may sometimes be executed in an opposite order, depending on the function involved. It should also be noted that each block in the block diagram and/or flowchart and the combination of blocks in the block diagram and/or flowchart may be implemented by a dedicated hardware-based system performing specified functions or operations, or by a combination of dedicated hardware and computer instructions.

The units described in the embodiments of the present disclosure may be implemented in a software or may be implemented in a hardware. In some cases, a name of a unit or a module does not limit the unit or module itself. For example, a sharing module may also be described as a "page sharing module".

The functions described above herein may be performed at least in part by one or more hardware logic components. For example, without limitation, exemplary types of hardware logic components that may be used include: a field programmable gate array (FPGA), an application specific integrated circuit (ASIC), an application specific standard parts (ASSP), a system on chip (SOC), and a complex programmable logic device (CPLD), etc.

In the context of the present disclosure, a machine-readable medium may be a tangible medium that may include or store a program for use by or in combination with an instruction execution system, apparatus or device. The machine-readable medium may be a machine-readable signal medium or a machine-readable storage medium. The machine-readable medium may include, but is not limited to, an electronic, magnetic, an optical, an electromagnetic, an infrared, or a semiconductor system, apparatus or device, or any suitable combination of the above. More specific examples of machine-readable storage media would include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage devices, or any suitable combination of the above.

According to one or more embodiments of the present disclosure, [Example 1] provides an information indicating method, the method includes:
  acquiring a first position parameter of first target information in a current page; where the current page is a page in a shared file shared by a sharer client;
  acquiring a second position parameter of second target information in a display page of the sharer client; and
  determining an indication identifier according to the first position parameter and the second position parameter, and indicating the second target information according to the indication identifier.

According to one or more embodiments of the present disclosure, [Example 2] provides an information indicating method, further including:
  in an implementation, the first position parameter and the second position parameter are determined based on a same position parameter determination rule.

According to one or more embodiments of the present disclosure, [Example 3] provides an information indicating method, further including:
  in an implementation, the position parameter determination rule includes any of the following:
  in a client presenting a shared file, determining the first position parameter and the second position parameter based on position information of the shared file presented at a first preset position of a client interface; or,
  in a client presenting a shared file, determining the first position parameter and the second position parameter based on position information of the shared file corresponding to a cursor in the shared file presented in a client interface.

According to one or more embodiments of the present disclosure, [Example 4] provides an information indicating method, further including:
  in an implementation, the determining the indication identifier according to the first position parameter and the second position parameter includes:
  determining the indication identifier according to the first position parameter and the second position parameter based on an indication identifier determination mode corresponding to a file type of the shared file; or,
  determining the indication identifier according to the first position parameter and the second position parameter based on a file type of the shared file and an indication identifier determination mode corresponding to display states of the shared file in the shared client and the sharer client.

According to one or more embodiments of the present disclosure, [Example 5] provides an information indicating method, further including:
  in an implementation, the indication identifier determination mode includes at least one of the following:
  a line parameter comparison mode, a column parameter comparison mode, a page parameter comparison mode and a scroll bar parameter comparison mode of a client interface.

According to one or more embodiments of the present disclosure, [Example 6] provides an information indicating method, further including:
  in an implementation, if the file type is a document type, determining the indication identifier according to the first position parameter and the second position parameter based on a line parameter comparison mode corresponding to the document type.

According to one or more embodiments of the present disclosure, [Example 7] provides an information indicating method, further including:
  in an implementation, the determining the indication identifier according to the first position parameter and the second position parameter based on the line parameter comparison mode corresponding to the document type includes:
  comparing a first document line parameter in the first position parameter with a second document line parameter in the second position parameter; and
  determining the indication identifier according to a comparison result of the first document line parameter and the second document line parameter.

According to one or more embodiments of the present disclosure, [Example 8] provides an information indicating method, further including:
  in an implementation, if the file type is a spreadsheet type, determining the indication identifier according to the first position parameter and the second position parameter based on a line parameter comparison mode and/or a column parameter comparison mode corresponding to the spreadsheet type.

According to one or more embodiments of the present disclosure, [Example 9] provides an information indicating method, further including:
  in an implementation, the determining the indication identifier according to the first position parameter and the second position parameter based on the line parameter comparison mode and/or the column parameter comparison mode corresponding to the spreadsheet type includes:
  calculating a line difference value between a first table line parameter in the first position parameter and a second table line parameter in the second position parameter;
  calculating a column difference value between a first table column parameter in the first position parameter and a second table column parameter in the second position parameter; and determining the indication identifier according to the line difference value and/or the column difference value.

According to one or more embodiments of the present disclosure, [Example 10] provides an information indicating method, further including:

in an implementation, the determining the indication identifier according to the line difference value and/or the column difference value includes:

comparing an absolute value of the line difference value with an absolute value of the column difference value;

determining the indication identifier based on the line difference value when the absolute value of the line difference value is greater than the absolute value of the column difference value;

determining the indication identifier based on the column difference value when the absolute value of the line difference value is less than the absolute value of the column difference value; and determining the indication identifier according to a difference value with a higher priority in the line difference value and the column difference value when the absolute value of the line difference value is equal to the absolute value of the column difference value.

According to one or more embodiments of the present disclosure, [Example 11] provides an information indicating method, further including:

in an implementation, before calculating the line difference value and the column difference value, further including:

judging whether a table identifier in the first position parameter is the same as a table identifier in the second position parameter; and if so, calculating the line difference value and the column difference value.

According to one or more embodiments of the present disclosure, [Example 12] provides an information indicating method, further including:

in an implementation, if the file type is a mind map type, determining the indication identifier according to the first position parameter and the second position parameter based on the mind map type and a line parameter comparison mode corresponding to display states of the shared file in the shared client and the sharer client.

According to one or more embodiments of the present disclosure, [Example 13] provides an information indicating method, further including:

in an implementation, the determining the indication identifier according to the first position parameter and the second position parameter based on the mind map type and the line parameter comparison mode corresponding to the display states of the shared file in the shared client and the sharer client includes:

judging whether the display state of the shared file in the shared client and the display state of the shared file in the sharer client are both in an outline view mode, where the outline view mode is a mode of folding/expanding a sub-subject under a subject is in response to a folding/expanding instruction;

if so, comparing a first subject line parameter in the first position parameter with a second subject line parameter in the second position parameter; and determining the indication identifier according to a comparison result of the first subject line parameter and the second subject line parameter.

According to one or more embodiments of the present disclosure, [Example 14] provides an information indicating method, further including:

in an implementation, if the file type is a presentation type, determining the indication identifier according to the first position parameter and the second position parameter based on the presentation type and a page parameter comparison mode corresponding to display states of the shared file in the shared client and the sharer client.

According to one or more embodiments of the present disclosure, [Example 15] provides an information indicating method, further including:

in an implementation, the determining the indication identifier according to the first position parameter and the second position parameter based on the presentation type and the page parameter comparison mode corresponding to the display states of the shared file in the shared client and the sharer client includes:

judging whether the display state of the shared file in the shared client is the same as the display state of the shared file in the sharer client;

if so, comparing a first document page parameter in the first position parameter with a second document page parameter in the second position parameter; and determining the indication identifier according to a comparison result of the first document page parameter and the second document page parameter.

According to one or more embodiments of the present disclosure, [Example 16] provides an information indicating method, further including:

if the file type is a portable document type, determining the indication identifier according to the first position parameter and the second position parameter based on a page parameter comparison mode corresponding to the portable document type.

According to one or more embodiments of the present disclosure, [Example 17] provides an information indicating method, further including:

in an implementation, the determining the indication identifier according to the first position parameter and the second position parameter based on the page parameter comparison mode corresponding to the portable document type includes:

comparing a first document page parameter in the first position parameter with a second document page parameter in the second position parameter; and determining the indication identifier according to a comparison result of the first document page parameter and the second document page parameter.

According to one or more embodiments of the present disclosure, [Example 18] provides an information indicating method, further including:

in an implementation, if the file type is a web page type, determining the indication identifier according to the first position parameter and the second position parameter based on a scroll bar parameter comparison mode of a client interface corresponding to the web page type.

According to one or more embodiments of the present disclosure, [Example 19] provides an information indicating method, further including:

in an implementation, the determining the indication identifier according to the first position parameter and the second position parameter based on the scroll bar parameter comparison mode of the client interface corresponding to the web page type includes:

comparing a first scroll bar position parameter relative to a client interface in the first position parameter with a second scroll bar position parameter relative to a client interface in the second position parameter; and determining the indication identifier according to a comparison result of the first scroll bar position parameter and the second scroll bar position parameter.

According to one or more embodiments of the present disclosure, [Example 20] provides an information indicating method, further including:

in an implementation, the indication identifier is used for indicating a direction.

According to one or more embodiments of the present disclosure, [Example 21] provides an information indicating method, further including:

in an implementation, the indicating the second target information according to the indication identifier includes:

setting an indication control at a second preset position in a client interface; and adding an arrow indication effect on the indication control according to the indication direction to indicate the second target information.

According to one or more embodiments of the present disclosure, [Example 22] provides an information indicating method, further including:

in an implementation, the indication control is displayed with an identity of the sharer client.

According to one or more embodiments of the present disclosure, [Example 23] provides an information indicating method, further including:

switching to a follow mode in response to a click instruction for the indication control, where the follow mode is a mode of following and displaying a display page of the sharer client.

According to one or more embodiments of the present disclosure, [Example 24] provides an information indicating method, further including:

stopping acquiring the first position parameter, acquiring the second position parameter, and determining the indication identifier according to the first position parameter and the second position parameter in the follow mode.

According to one or more embodiments of the present disclosure, [Example 25] provides an information indicating method, further including:

in an implementation, the indication control is a button control.

According to one or more embodiments of the present disclosure, [Example 26] provides an information indicating method, further including:

in an implementation, the method is applied to a real-time interactive application, and the real-time interactive application includes at least one of an instant messaging application, a multimedia conference application, a live video application and a group chat interactive application.

According to one or more embodiments of the present disclosure, [Example 27] provides an information indicating method, further including:

in an implementation, the current page is a page presented by a shared client.

The above description is only preferred embodiments of the present disclosure and an illustration of technical principles employed. Those skilled in the art should understand that the disclosure scope involved in the present disclosure is not limited to the technical solutions formed by the specific combination of above technical features, but also covers other technical solutions formed by arbitrary combination of the above technical features or their equivalent features without departing from the above disclosed concept, for example, a technical solution formed by replacing the above features with (but not limited to) the technical features with similar functions disclosed in the present disclosure.

In addition, although operations are described in a specific order, this should not be understood as requiring the operations to be performed in a specific order shown or in a sequential order. Under certain circumstances, multitasking and parallel processing may be advantageous. Similarly, although several specific implementation details are included in the above discussion, these should not be interpreted as limiting the scope of the present disclosure. Certain features described in the context of separate embodiments may also be implemented in combination in a single embodiment. Conversely, various features described in the context of a single embodiment may also be implemented in multiple embodiments separately or in any suitable sub-combination.

Although a subject matter has been described in language specific to structural features and/or logical actions of methods, it should be understood that the subject matter defined in appended claims is not necessarily limited to the specific features or actions described above. On the contrary, the specific features and actions described above are only exemplary forms for implementing the claims.

What is claimed is:

1. An information indicating method, comprising:
    acquiring a first position parameter of first target information in a current page of a shared client, wherein the current page is a page in a shared file shared by a sharer client;
    acquiring a second position parameter of second target information in a display page included in the shared file from the sharer client; and
    generating a graphical indication identifier element according to the first position parameter and the second position parameter, wherein the indication identifier indicates a direction from the first target information to the second target information in an interface of the shared client;
    wherein determining the indication identifier according to the first position parameter and the second position parameter comprises:
    determining the indication identifier according to the first position parameter and the second position parameter based on an indication identifier determination mode corresponding to a file type of the shared file, or
    determining the indication identifier according to the first position parameter and the second position parameter based on a file type of the shared file and an indication identifier determination mode corresponding to display states of the shared file in a shared client and the sharer client.

2. The method according to claim 1, wherein the first position parameter and the second position parameter are determined based on a same position parameter determination rule.

3. The method according to claim 2, wherein the position parameter determination rule comprises any of the following:
    in a client presenting a shared file, determining the first position parameter and the second position parameter based on position information of the shared file presented at a first preset position of a client interface; or, in a client presenting a shared file, determining the first position parameter and the second position parameter based on position information of the shared file corresponding to a cursor in the shared file presented in a client interface.

4. The method according to claim 1, wherein the indication identifier determination mode comprises at least one of the following:

a line parameter comparison mode, a column parameter comparison mode, a page parameter comparison mode and a scroll bar parameter comparison mode of a client interface.

5. The method according to claim 4, wherein if the file type is a document type, determining the indication identifier according to the first position parameter and the second position parameter based on a line parameter comparison mode corresponding to the document type.

6. The method according to claim 4, wherein determining the indication identifier according to the first position parameter and the second position parameter based on the line parameter comparison mode corresponding to the document type comprises:

comparing a first document line parameter in the first position parameter with a second document line parameter in the second position parameter; and determining the indication identifier according to a comparison result of the first document line parameter and the second document line parameter.

7. The method according to claim 4, wherein if the file type is a spreadsheet type, determining the indication identifier according to the first position parameter and the second position parameter based on a line parameter comparison mode and/or a column parameter comparison mode corresponding to the spreadsheet type.

8. The method according to claim 7, wherein determining the indication identifier according to the first position parameter and the second position parameter based on the line parameter comparison mode and/or the column parameter comparison mode corresponding to the spreadsheet type comprises:

calculating a line difference value between a first table line parameter in the first position parameter and a second table line parameter in the second position parameter;

calculating a column difference value between a first table column parameter in the first position parameter and a second table column parameter in the second position parameter; and determining the indication identifier according to the line difference value and/or the column difference value.

9. The method according to claim 8, wherein determining the indication identifier according to the line difference value and/or the column difference value comprises:

comparing an absolute value of the line difference value with an absolute value of the column difference value;

determining the indication identifier based on the line difference value when the absolute value of the line difference value is greater than the absolute value of the column difference value;

determining the indication identifier based on the column difference value when the absolute value of the line difference value is less than the absolute value of the column difference value; and determining the indication identifier according to a difference value with a higher priority in the line difference value and the column difference value when the absolute value of the line difference value is equal to the absolute value of the column difference value.

10. The method according to claim 9, wherein before calculating the line difference value and the column difference value, the method further comprises:

judging whether a table identifier in the first position parameter is the same as a table identifier in the second position parameter; and if so, calculating the line difference value and the column difference value.

11. The method according to claim 4, wherein if the file type is a mind map type, determining the indication identifier according to the first position parameter and the second position parameter based on the mind map type and a line parameter comparison mode corresponding to display states of the shared file in the shared client and the sharer client.

12. The method according to claim 11, wherein determining the indication identifier according to the first position parameter and the second position parameter based on the mind map type and the line parameter comparison mode corresponding to the display states of the shared file in the shared client and the sharer client comprises:

judging whether the display state of the shared file in the shared client and the display state of the shared file in the sharer client are both in an outline view mode, wherein the outline view mode is a mode of folding a sub-subject under a subject in response to a folding instruction, or the outline view mode is a mode of expanding a sub-subject under a subject in response to an expanding instruction;

if so, comparing a first subject line parameter in the first position parameter with a second subject line parameter in the second position parameter; and determining the indication identifier according to a comparison result of the first subject line parameter and the second subject line parameter.

13. The method according to claim 4, wherein if the file type is a presentation type, determining the indication identifier according to the first position parameter and the second position parameter based on the presentation type and a page parameter comparison mode corresponding to display states of the shared file in the shared client and the sharer client.

14. The method according to claim 13, wherein determining the indication identifier according to the first position parameter and the second position parameter based on the presentation type and the page parameter comparison mode corresponding to the display states of the shared file in the shared client and the sharer client comprises:

judging whether the display state of the shared file in the shared client is the same as the display state of the shared file in the sharer client;

if so, comparing a first document page parameter in the first position parameter with a second document page parameter in the second position parameter; and determining the indication identifier according to a comparison result of the first document page parameter and the second document page parameter.

15. The method according to claim 4, wherein if the file type is a portable document type, determining the indication identifier according to the first position parameter and the second position parameter based on a page parameter comparison mode corresponding to the portable document type.

16. The method according to claim 15, wherein determining the indication identifier according to the first position parameter and the second position parameter based on the page parameter comparison mode corresponding to the portable document type comprises:

comparing a first document page parameter in the first position parameter with a second document page parameter in the second position parameter; and determining the indication identifier according to a comparison result of the first document page parameter and the second document page parameter.

17. The method according to claim 4, wherein if the file type is a web page type, determining the indication identifier according to the first position parameter and the second position parameter based on a scroll bar parameter comparison mode of a client interface corresponding to the web page type.

18. The method according to claim 17, wherein determining the indication identifier according to the first position parameter and the second position parameter based on the scroll bar parameter comparison mode of the client interface corresponding to the web page type comprises:

comparing a first scroll bar position parameter relative to a client interface in the first position parameter with a second scroll bar position parameter relative to a client interface in the second position parameter; and determining the indication identifier according to a comparison result of the first scroll bar position parameter and the second scroll bar position parameter.

19. The method according to claim 1, wherein the indication identifier is used for indicating a direction.

20. The method according to claim 19, wherein indicating the second target information according to the indication identifier comprises:

setting an indication control at a second preset position in a client interface; and adding an arrow indication effect on the indication control according to the direction to indicate the second target information.

21. The method according to claim 20, further comprising:

switching to a follow mode in response to a click instruction for the indication control, wherein the follow mode is a mode of following and displaying a display page of the sharer client.

22. The method according to claim 21, further comprising:

stopping acquiring the first position parameter, receiving the second position parameter, and determining the indication identifier according to the first position parameter and the second position parameter in the follow mode.

23. The method according to claim 20, wherein the indication control is a button control.

24. The method according to claim 1, wherein the indication control is displayed with an identity of the sharer client.

25. The method according to claim 1, wherein the method is applied to a real-time interactive application, and the real-time interactive application comprises at least one of an instant messaging application, a multimedia conference application, a live video application and a group chat interactive application.

26. The method according to claim 1, wherein the current page is a page presented by a shared client.

27. An information indicating apparatus, comprising:
one or more processors;
a storage apparatus, configured to store one or more programs, when the one or more programs are executed by the one or more processors, the one or more processors are configured to:

acquire a first position parameter of first target information in a current page of a shared client, wherein the current page is a page in a shared file shared by the sharer client;

acquire a second position parameter of second target information in a display page included in the shared file from the sharer client; and generating a graphical indication identifier element according to the first position parameter and the second position parameter, wherein the indication identifier indicates a direction from the first target information to the second target information in an interface of the shared client;

wherein the one or more processors are further configured to:

determine the indication identifier according to the first position parameter and the second position parameter based on an indication identifier determination mode corresponding to a file type of the shared file, or determine the indication identifier according to the first position parameter and the second position parameter based on a file type of the shared file and an indication identifier determination mode corresponding to display states of the shared file in a shared client and the sharer client.

28. A non-transitory storage medium comprising computer executable instructions, wherein when the computer executable instructions are executed by a computer processor, the computer processor is configured to:

acquire a first position parameter of first target information in a current page of a shared client, wherein the current page is a page in a shared file shared by the sharer client;

acquire a second position parameter of second target information in a display page included in the shared file from the sharer client; and generating a graphical indication identifier element according to the first position parameter and the second position parameter, wherein the indication identifier indicates a direction from the first target information to the second target information in an interface of the shared client;

wherein the computer processor is further configured to:
determine the indication identifier according to the first position parameter and the second position parameter based on an indication identifier determination mode corresponding to a file type of the shared file, or determine the indication identifier according to the first position parameter and the second position parameter based on a file type of the shared file and an indication identifier determination mode corresponding to display states of the shared file in a shared client and the sharer client.

* * * * *